UNITED STATES PATENT OFFICE.

WILLIAM H. CLOUD, OF YAKIMA, WASHINGTON.

PROCESS FOR PREPARING FOODS.

1,411,479. Specification of Letters Patent. Patented Apr. 4, 1922.

No Drawing. Application filed November 1, 1920. Serial No. 420,893.

*To all whom it may concern:*

Be it known that I, WILLIAM H. CLOUD, a citizen of the United States, and resident of the city of Yakima, county of Yakima, State of Washington, have invented certain new and useful Improvements in Processes for Preparing Foods, of which the following is a specification.

This invention relates to improvements in a process for preparing fruit and vegetables for use as food; more particularly, it relates to a process of preparing apples or similar fruit by a process wherein the fruit is toasted as distinguished from being cooked.

The principal object of the invention resides in the preparation of fruit and vegetables by a process whereby the fruit or vegetable retains all of its original flavor, is given a very palatable taste, and may be used either with or without further cooking.

In carrying out the present process, the fruit to be prepared is first cleaned and cored in the usual manner, and is then dehydrated, after which it is passed through a cutting machine of that type whereby it is cut into fine pieces or ground, and thence pressed from the cutting machine preferably through a perforated plate so that the product comes out in a vermiculated form, or in the form of what I term "crinkles."

The product is then passed through a toasting oven or rolls, where the surfaces are browned and toasted under an evenly applied heat, making the crinkles or flakes crisp and palatable.

This process is distinguished from processes of a similar character in that the fruit is not boiled or cooked and goes through no process whatever whereby the natural flavor is impaired, but to the contrary is given a distinctly enriched flavor.

Such a process has been found to be very successful as a means of preserving fruit or vegetables. It is an inexpensive process and leaves the product in such condition that it will keep indefinitely.

Having thus described my invention, what I claim as new therein and desire to secure by Letters-Patent, is:

A process for preparing fruit and vegetables for food, which consists in first drying the product, thence cutting it into small pieces, passing said pieces under pressure through a perforated plate to form crinkles, and thence toasting the crinkled pieces in an evenly applied heat.

Signed at Seattle, Washington, this 26th day of October, 1920.

WILLIAM H. CLOUD.